United States Patent
Lagares Gamero (10) Patent No.: US 11,617,373 B2
(45) Date of Patent: Apr. 4, 2023

(54) MEAT PROCESSING UNIT AND METHOD FOR THE PRODUCTION OF AN EXTRUDED MEAT PRODUCT

(71) Applicant: METALQUIMIA, SAU, Girona (ES)

(72) Inventor: Josep Lagares Gamero, Besalu (ES)

(73) Assignee: Metalquimia, SAU, Girona (ES)

( * ) Notice: Subject to any disclaimer, the term of this patent is extended or adjusted under 35 U.S.C. 154(b) by 281 days.

(21) Appl. No.: 17/044,375

(22) PCT Filed: Apr. 2, 2019

(86) PCT No.: PCT/EP2019/058291
§ 371 (c)(1),
(2) Date: Oct. 1, 2020

(87) PCT Pub. No.: WO2019/193003
PCT Pub. Date: Oct. 10, 2019

(65) Prior Publication Data
US 2021/0100255 A1    Apr. 8, 2021

(30) Foreign Application Priority Data
Apr. 6, 2018 (EP) ...................................... 18382235

(51) Int. Cl.
A22C 11/00 (2006.01)
A23L 13/60 (2016.01)
A23P 30/20 (2016.01)

(52) U.S. Cl.
CPC .......... *A22C 11/001* (2013.01); *A22C 11/008* (2013.01); *A23L 13/60* (2016.08);
(Continued)

(58) Field of Classification Search
CPC ..... A22C 11/001; A22C 11/008; A23L 13/67; A23P 30/20; B29C 48/05; B29C 48/355; B29C 48/00
See application file for complete search history.

(56) References Cited

U.S. PATENT DOCUMENTS 3,633,245 A * 1/1972 Partos ................. A22C 7/0015
425/348 R
4,207,281 A 6/1980 Bernard

FOREIGN PATENT DOCUMENTS

EP    1749444 A1    2/2007
EP    2213178 A1    8/2010
(Continued)

OTHER PUBLICATIONS

European Patent Office: PCT International Search Report for PCT/EP2019/058291 dated Jun. 3, 2019; entire document.

*Primary Examiner* — Drew E Becker
*Assistant Examiner* — Ariel M Miller
(74) *Attorney, Agent, or Firm* — Allen, Dyer, Doppelt & Gilchrist, P.A.

(57) ABSTRACT

The proposed invention includes an extruder apparatus (1) for a minced meat product with a distribution chamber (10) provided with an inlet opening (11) and with multiple outlet openings (12) of identical section, each one in communication with an extruder head (50) through a distribution duct (40) to produce the extrusion on a conveyor surface (2) movable through an air treatment unit (60), wherein each extruder head is connected to one of the distribution ducts and comprises a cutting device including a plunger inserted in the extruder head movable from an extruding position, in which the plunger does not interfere with the connection with the distribution duct, to a cutting position in which the plunger completely blocks said connection and in which the plunger reaches or goes beyond an extruding opening of the duct to eject all of the extruded meat product from the interior of the duct.

15 Claims, 6 Drawing Sheets

(52) U.S. Cl.
CPC ............... *A23L 13/67* (2016.08); *A23P 30/20* (2016.08); *A23V 2002/00* (2013.01)

(56) References Cited

FOREIGN PATENT DOCUMENTS

FR 1360422 5/1964
GB 1547906 6/1979

\* cited by examiner

MEAT PROCESSING UNIT AND METHOD FOR THE PRODUCTION OF AN EXTRUDED MEAT PRODUCT

FIELD OF THE ART

The present invention relates to the field of meat processing units for the production of an extruded meat product and also to the production method by means of such a unit. Said unit includes a pump that forces a meat product flow through a distribution duct up to an extruder apparatus that includes an inlet opening of a distribution chamber that includes multiple outlet openings, thereby producing a distribution of said meat product flow between the different outlet openings that communicate with multiple extruder heads. The meat product extruded through said extruder heads, in the shape of multiple elongated strings, is then laid on a conveyor surface that takes it to an air treatment unit that reduces its surface humidity generating a crust that allows for the handling of the extruded meat product.

STATE OF THE ART

Multi-head extruder apparatuses are known in the state of the art for the production of an extruded meat product, capable of extruding meat stuff coming from a meat stuff impeller pump simultaneously through multiple heads, distributing said meat stuff through a distribution chamber.

However, said apparatuses typically deliver the meat product by stuffing it in a wrapping film, for example intestine, that contains and conforms the meat stuff, thereby compensating for possible differences in the delivery rate of the meat stuff in each of the heads. Additionally, said wrapping allows for an immediate handling of the meat stuff after being ejected from the extruder, so that a different rate between the different extruders poses no problem.

Documents are also known in which a gelled coating is substituted for the wrapping film, but which in any case allows for the handling of the meat product immediately after the extrusion, the application of the coating and its gelification. Typically, the coating is included in the extruder head itself in liquid form, and its gelification is typically produced by spraying or submerging the extruded meat product with a chemical that, in contact with the coating, causes its immediate gelification allowing for the immediate handling of the extruded meat product.

It is known that a meat product flow rate forced under pressure through a duct produces a lubricating effect near the walls, due to the melting of part of the fat contained in the meat stuff, which accelerates the flow of the meat stuff near said walls, opposite to what occurs with other fluids such as water, being able to cause an uneven distribution of the meat product flow rate extruded by the different extruder heads, which will produce unevenness between the meat products extruded through the different extruder heads. This effect is more pronounced the smaller the diameter of the extruded meat product is.

Document EP1749444A1 describes a meat processing unit that allows the extrusion of a plurality of small diameter meat product strings that ensures a uniform and constant flow rate in all the extrusion heads, allowing for a simultaneous laying of all the extruded meat strings on the same conveyor surface without flow rate variations of some of the extruders causing unexpected build-ups or interruptions in one of the meat product strings.

This document EP1749444A1 also describes the use of a blade, transversal to the elongated strings of extruded meat and adjacent to the extruding opening of the extruder heads, to cut said elongated strings at will. Said blade will produce the squeezing of the end portions of the elongated strings. Said squeezed end portions will be excessively dehydrated during the curing of the elongated strings, producing an unpleasant hardened end portion.

Meat product air treatment units are also known—for instance, from document EP2213178—applied to the curing of sausage slices. In these air treatment units, the meat product must be frozen before its air treatment, to allow for its handling, cut and laying on a conveyor surface, typically trays. After the air treatment carried out on the meat product slices, these are thawed and their curing allows for their handling, though in these cases it prevents an excessive drying that may result in a dehydrated crust.

There is a need for a meat processing unit which can provide elongated strings of meat product with flat ends which curable in an air treatment unit producing a meat product without wrapping film or gelled coating and without producing excessive hardening of the end portions thereof.

BRIEF DESCRIPTION OF THE INVENTION

The present invention concerns a meat processing unit for the production of an extruded meat product lacking a wrapping film and a gelled coating.

An extruded meat product is a product composed of a mixture of minced meat pieces that have been brought together in the shape of a string by means of an extrusion process.

Typically, this type of product has a wrapping film, such as, for example, natural or synthetic intestine, or a gelled coating that prevent the breaking up of said extruded meat product. However, the present invention allows obtaining an extruded meat product without the need to use any wrapping film or any gelled coating, thanks to a precise control of the homogeneity of multiple meat product flows extruded in the shape of multiple elongated strings that are extruded simultaneously by a plurality of extruder heads on a conveyor surface.

Precisely due to the lack of a wrapping film or of a gelled coating, the elongated strings of the extruded meat product are very fragile and cannot be handled nor repositioned at all, so that an uneven extrusion or a non-constant flow of some of the elongated strings of the extruded meat product would produce an incorrect laying on the conveyor surface that would not be possible to correct.

For example, if some of the extruder heads extrude a flow smaller or larger than the one anticipated, the speed of the conveyor surface will be inadequate, causing unexpected interruptions or undesired build-ups of the extruded meat product by some of the extruder heads. Therefore, the extrusion flow homogeneity of all the extruder heads is essential.

Once the meat product elongated strings have been correctly laid on the conveyor surface, the latter passes them into an air treatment unit that dries them to make them manageable in spite of lacking a coating or wrapping.

The proposed meat processing unit comprises:
   a minced meat product extruder apparatus that includes a distribution chamber provided with an inlet opening, connected to a minced meat product impeller pump, and multiple outlet openings of identical section, each one in communication with an extruder head, of an assembly of extruder heads, through a distribution duct for the extrusion of the minced meat product in the shape of extruded meat product elongated strings; and a conveyor surface facing said extruder heads for receiving the extruded meat product.

Thus, the minced meat product is pushed by an impeller pump making it go through an inlet opening so as to fill a distribution chamber, from which it exits through multiple outlet openings that distribute the minced meat product flow and take it to multiple extruder heads through distribution ducts.

Preferably, the distribution chamber involves a widening relative to the distribution duct connected with the inlet opening.

It is also recommended that the combined section of all the outlet openings be equal to the inlet opening section, thereby ensuring that the minced meat product can flow correctly.

The conveyor surface may be, for instance, a conveyor belt or stackable trays. The stackable trays have the advantage that they can be stacked and passed into the air treatment unit as a column or passed individually inside the air treatment unit and be moved across its interior in an upwards and/or downwards direction forming columns, thereby downsizing the air treatment unit.

The air treatment unit may be, by way of example, like the air treatment unit described in EP2213178, by the same applicant.

The proposed unit further includes the following features:
the outlet openings are arranged equidistant to the inlet opening and in radial symmetry around a geometric axis defined by a geometric centre of the inlet opening, in an annular arrangement;
the distribution chamber also includes one bottom wall facing said inlet opening centred relative to the geometric axis and a perimeter wall surrounding said inlet opening and said bottom wall and having radial symmetry around the geometric axis corresponding to the radial symmetry of the outlet openings, all outlet openings being equidistant to the perimeter wall;
said distribution ducts all have the same length between each outlet opening and its corresponding extruder head, and each extruder head includes a cutting device;
the conveyor surface goes through an air treatment unit configured to apply an air current with controlled temperature, humidity and speed against a raw extruded product for obtaining a hardened dehydrated outer crust to produce cohesion and allow for the handling of the extruded meat product.

In other words, the outlet openings are all arranged in an annular configuration around the geometric axis, equidistant to the inlet opening. The shape of the distribution chamber also follows a radial geometry around the first geometric axis.

Said geometric axis is defined by the geometric axis of the inlet opening and is perpendicular to the cross-section of said inlet opening, and therefore parallel to the flow direction of the minced meat product moving therethrough.

If there are, for instance, four outlet openings, they will be separated 90° from each other, and the distribution chamber will also have radial geometry with four symmetrical 90° quadrants. Another larger or smaller number of outlet openings is also contemplated.

It is known that a flow of minced meat product forced through a duct causes some melting of the fat particles, which lubricates the walls of said duct. This causes the meat product to move at a greater speed than in the regions in contact with said wall.

This phenomenon causes the flow of the minced meat product to move unevenly across the interior of the extruder apparatus, so that, by dividing said flow into multiple strings, each of said meat product strings will have a different density or will be extruded at different speeds.

This phenomenon is more pronounced the smaller the section of the extruded meat product string produced is, being highly pronounced in strings with a section equal to or smaller than 25 mm$^2$.

The proposed distribution in radial symmetry of the outlet openings, together with the geometry of the distribution chamber, also of radial symmetry, ensures that the conditions of each outlet opening are identical to the conditions of the remaining outlet openings, i.e., that the minced meat product flow travels the same length, and that the conditions of its contact with the walls of the first distribution chamber are also homogeneous, whatever the outlet opening through which said minced meat product flow exits the first distribution chamber may be.

This ensures that the meat product flow is homogeneous in all of the outlet openings.

However, the radial symmetry distribution generates multiple extruded meat product strings in a radial arrangement that can hardly be laid on a conveyor surface in homogeneous conditions without interfering with each other. To best way to obtain said correct laying is to extrude a plurality of strings from multiple extruder heads equidistant in a linear arrangement, managing to simultaneously lay multiple parallel and equidistant meat product strings on the conveyor surface. If laying the strings in another arrangement that is not parallel and equidistant is desired, the extruder heads may be arranged in a different order, but this is only possible if the position of said extruder heads is unlinked from the radial arrangement of the outlet openings.

That is why, between each outlet opening arranged in radial symmetry and each extruder head, it is proposed to arrange a distribution duct, which allows to modify the position of the extruder heads relative to the position of the outlet openings.

All of the distribution ducts have an identical length, which ensures that the conditions to which the meat product flow travelling along them all is subject to are also identical, and, therefore, the delivery speed of all of the extruded meat product strings, as well as their density, will be identical to each other. Preferably, the distribution ducts are flexible.

The conveyor surface will have its speed coordinated with the delivery speed of the extruded meat product strings, so that their laying may occur uniformly without undue stresses, interruptions or build-ups, which could happen if said conveyor surface speed were not adequate.

The extruded meat product strings laid on the conveyor surface may not be handled, repositioned or transferred from the conveyor surface to another carrier without a risk of being broken up, interrupted or being seriously strained, due to the lack of wrapping or gelled coating; that is why the conveyor surface passes the strings into an air treatment unit configured to apply an air current with controlled temperature, humidity and speed against the raw extruded product for obtaining a hardened dehydrated outer crust to produce cohesion and allow for the handling of the extruded meat product.

In other words, the cohesion and stability of each extruded meat product string are obtained through dehydration of the outer layers of the extruded meat product, which generates a crust enveloping the product allowing for its handling and, therefore, its transfer from the conveyor surface to another carrier.

The air treatment unit is of the type that includes a closed casing with an inlet opening and an outlet crossed by the conveyor surface, internal air of the casing being left substantially separated from the external air, allowing for the control of the conditions of said internal air of the casing. A number of ducts communicate a treated air production unit with the interior of the casing, where a number of blow openings direct the treated air flow against the conveyor surface that supports the extruded meat product.

It is proposed that each extruder head of the extruder apparatus include a cutting device that allows to interrupt the extruded meat product string at will.

According to a preferred embodiment, each extruder head will consist of an extruder duct with a plunger opening in one end, an extrusion opening in the opposed end of said extruder duct facing the conveyor surface for the ejection of the extruded meat product, and with a side opening connected with one of the distribution ducts, said side opening being between the plunger opening and the extrusion opening.

Said cutting device will be integral with each extruder head including a plunger inserted in the extruder duct through the plunger opening and movable within the extruder duct from an extruding position, in which the plunger does not interfere with a side opening, and a cutting position, in which the plunger will completely block the side opening, thereby interrupting the minced meat product flow.

Preferably, in the cutting position, the plunger will reach or even go beyond the extruding opening, thereby ejecting all of the meat content from the interior of the extruder duct and facilitating the separation of the end portion of the elongated string of extruded meat from the extrusion head and from the plunger, producing a regular and abrupt string end.

Preferably, the extruder duct is a cylindrical duct and a guiding device will be connected to the plunger determining a helical movement of the plunger between the extruding position and the cutting position, which improves the cutting operation of the flow, managing to produce a much more regular and abrupt string end. In addition, the rotating movement of the plunger end in contact with the minced meat product within the cylindrical duct prevents the adhesion of the extruded meat product string end to said plunger.

These features are important, because, since the strings are subject to a surface dehydration process, an end area of uneven section would dry excessively by having a smaller section, producing hard and dry areas that are unpalatable to the consumer.

Preferably, the guiding device will include a cam and a cam follower to produce the rotation of the plunger in its stroke within the cylindrical duct.

It is also proposed that the outlet openings of the extruder apparatus may be arranged in the first bottom wall or, according to another proposed alternative, in the first perimeter wall of the first distribution chamber, but, in any case, in radial symmetry around said geometric axis. Preferably, there will be six or more outlet openings in the distribution chamber.

According to a proposed embodiment, the first distribution chamber has a circular bottom wall and a frustoconical perimeter wall. The outlet openings will be distributed angularly, for example in the circular bottom wall.

Preferably, the first geometric axis will be vertical. This way, the minced meat product flow direction will also be vertical, preferably downwards, and gravity will equally affect the entire section, thereby avoiding uneven behaviour from one side or another.

Preferably, each of the outlet opening, the distribution duct and the extruder head will have a section with an area equal to or smaller than 25 $mm^2$, producing extruded meat product strings of that same diameter that are laid in parallel on the conveyor surface.

The minced meat product must have a particle size smaller than 25 $mm^2$ to avoid blockage; preferably, the maximum particle size will be smaller than 12 $mm^2$ but, more preferably, it will be a particle size visible with the naked eye, for example greater than 2 $mm^2$, avoiding the creation of a mass of emulsified meat product.

The combined area of all of the outlet openings of the distribution chamber will preferably be equal to the area of the inlet opening of the distribution chamber.

The proposed meat processing unit also includes an air treatment unit that applies an air current with controlled temperature, humidity and speed against the raw extruded meat product during a set period of time, until desired humidity is achieved in at least the outer surface of the extruded meat product string. The drying of the outer layer of the extruded meat product string makes it possible for said food to be handled without causing its breakage, thereby allowing its retrieval from the conveyor surface.

Preferably, the air treatment unit applies an air current with a temperature between 30° C. and 50° C. and with a relative humidity lower than 25%.

The obtained result will be an extruded meat product lacking a wrapping film and a gelled coating that will have a section equal to or smaller than 25 $mm^2$ and an outer dehydrated crust. Preferably, it is proposed that the air treatment unit be configured to treat the strings for a preset time until obtaining extruded meat product strings with a relative humidity lower than 15% in its crust. The interior humidity of said extruded meat product string will be greater than that of the crust; for instance, greater than 20%.

Preferably, the impeller pump feeding the inlet opening will be configured to force the minced meat product at a pressure equal to or lower than 500 kPa, which ensures that the fat and meat particle structure constituting the minced meat product is preserved that constitute, avoiding an excessive emulsifying or an excessive melting of the fat particles.

It is also proposed that an end of the plunger, which is in contact with the meat product contained in the extruder duct, is a flat end perpendicular to the movement direction of the plunger. This reduces the surface contact between the plunger and the end portions of the elongated strings of extruded meat, reducing the adhesion between them and assures that the resulting end portion of the elongated strings will be also a flat end.

Another aspect of the present invention relates to a method applied with the previously described meat processing unit.

The method consists of the following steps:
a) forcing the minced meat product through the extruder apparatus by means of the impeller pump producing:
   the complete filling of the distribution chamber;
   an even distribution of the minced meat product through the multiple outlet openings of the distribution chamber, producing multiple homogeneous flows of the minced meat product that flow to the multiple extruder heads through the distribution ducts;
   the extrusion of the minced meat product through the multiple extruder heads, producing multiple elongated strings of extruded meat product, all of them with an even extrusion flow;

b) laying said elongated strings of extruded meat product on the conveyor surface that moves at a speed coordinated with the delivery speed of the extruded meat product;

c) conveying, by means of said conveyor surface, the extruded meat product through an air treatment unit that applies an air current with controlled temperature, humidity and speed against the raw extruded product, until obtaining a treated extruded meat product with a hardened dehydrated outer crust to produce cohesion and allow for the handling of the extruded meat product.

According to an embodiment, the air treatment unit applies an air current with a temperature between 30° C. and 50° C. and with a relative humidity lower than 25%.

Preferably, the extruded meat product is treated by the air treatment unit until an outer crust with a relative humidity lower than 15% and a core with a relative humidity greater than 20% are produced.

It is also proposed that the cutting device of each extruder head be driven at preset intervals moving from the extruding position to the cutting position producing a helical movement of the plunger in said path, and immediately returning to the extruding position, producing a cut in the elongated string of the extruded meat product laid on the conveyor surface.

It will be understood that any range of values offered may not be optimal in its extreme values and may require adjustments of the invention so that said extreme values will be applicable, said adjustment being within the expertise of a skilled artisan.

Other features of the invention will appear in the following detailed description of an exemplary embodiment.

BRIEF DESCRIPTION OF THE FIGURES

The foregoing and other advantages and features will be more completely understood from the following detailed description of an exemplary embodiment with reference to the attached drawings, which must be taken by way of illustration and not limitation, in which.

DETAILED DESCRIPTION OF AN EXEMPLARY EMBODIMENT

The attached figures show exemplary embodiments with a non-limiting, illustrative character of the present invention.

Figure 1:
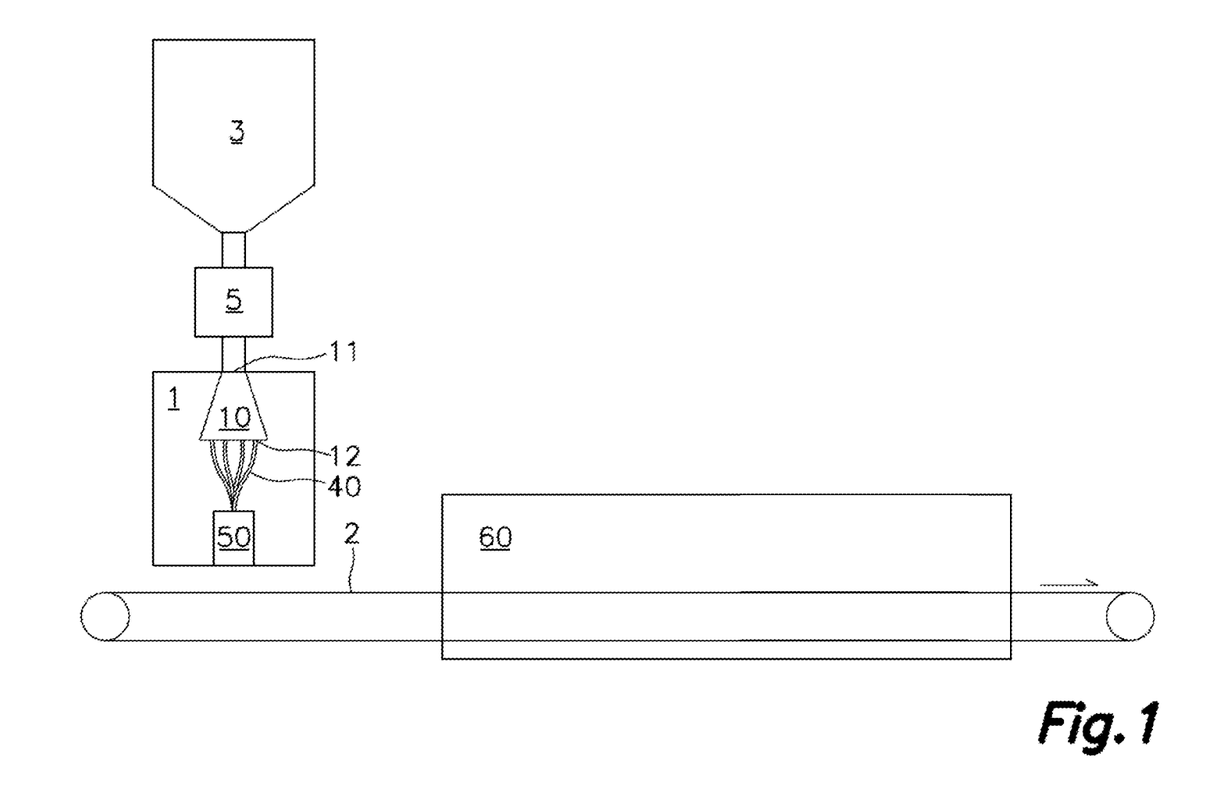
FIG. 1 depicts a schematic longitudinal sectional view of the proposed meat processing unit.

According to a first exemplary embodiment shown in FIG. 1, the meat processing unit consists of an extruder apparatus 1, a conveyor surface 2 and an air treatment unit.

FIG. 1 shows the conveyor surface as a conveyor belt but said conveyor surface may also be a plurality of stackable trays that that pass underneath the extruder heads 50.

The stackable condition of the trays is achieved by means of protruding perimeter supports above and/or below the conveyor surface, preferably combined with a number of fitting elements that ensure the correct positioning of the stacked trays. The trays may also or alternatively include some protruding dragging elements configured to cooperate with a dragging device to achieve the movement of the trays.

The extruder apparatus 1 receives a minced meat product flow impelled by an impeller pump 5 through a feeding duct from the minced meat product tank 3. It is recommended that said impeller pump 5 force the minced meat product with a pressure equal to or lower than 500 kPa to avoid the excessive melting of the fat nodules contained in the minced meat product, and avoiding its emulsification.

The minced meat product flow is then passed into a distribution chamber 10 through a circular inlet opening 11 that defines a first vertical geometric axis 1E in its centre.

Figure 2:
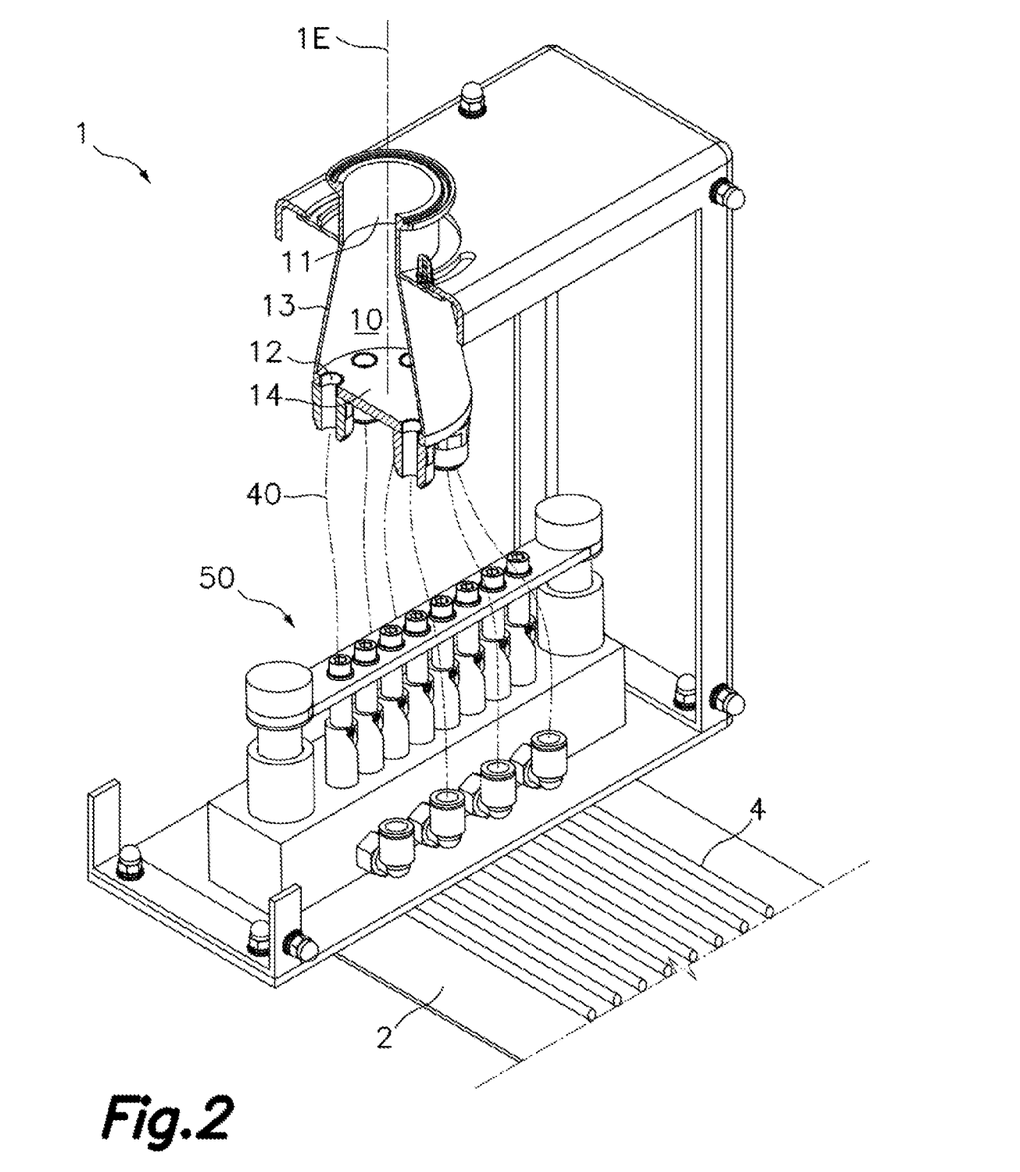
FIG. 2 depicts a partially sectioned perspective view of the extruder apparatus, in which the distribution ducts are only shown as a phantom line.
Figure 4:
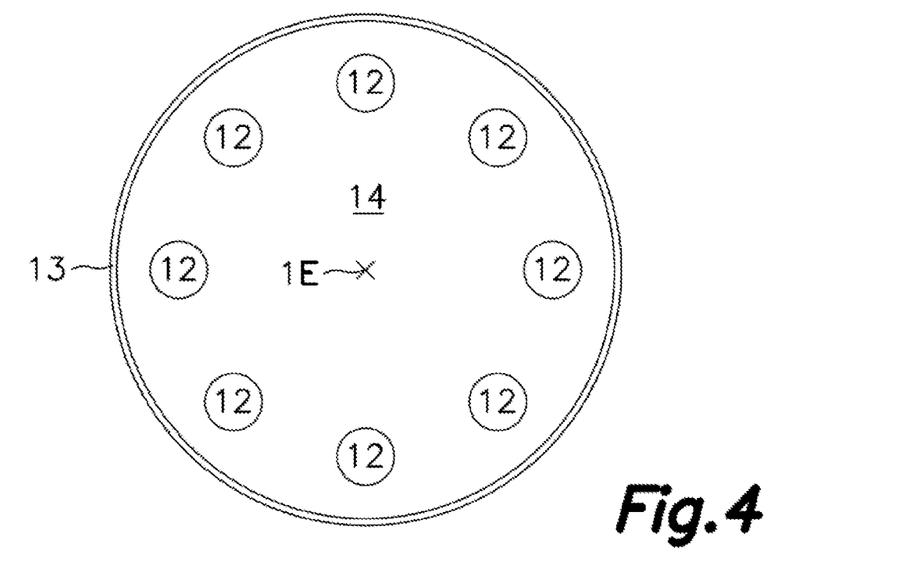
FIG. 4 depicts a horizontal section of the distribution chamber, showing the bottom wall and the outlet openings arranged on said bottom wall.
Figure 5:
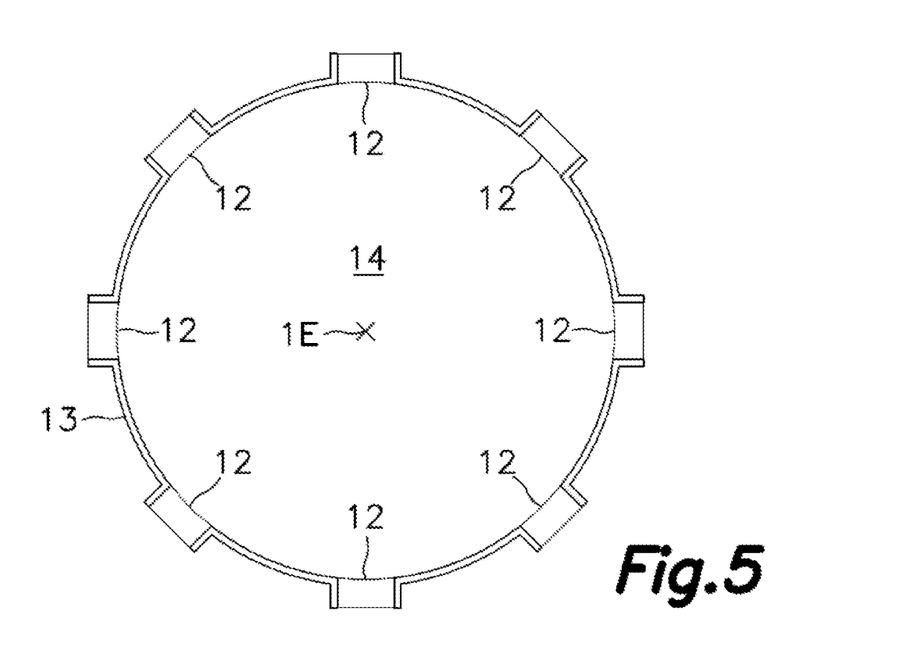
FIG. 5 depicts a horizontal section of the distribution chamber, showing the bottom wall and the corresponding outlet openings arranged on the perimeter wall.

The distribution chamber 10 has a geometry defined by the frustoconical perimeter wall 13 and by a circular bottom wall 14, shown in FIGS. 2,4 and 5, opposite the inlet opening 11. The perimeter wall 13 has an upper end of identical diameter as that of the inlet opening 11, and a lower end of identical diameter as that of the bottom wall 14.

In the embodiment shown in FIGS. 2 and 4, the bottom wall 14 has multiple outlet openings 12 of the distribution chamber 10, distributed annularly, in radial symmetry around the geometric axis 1E; however, it also contemplated that the outlet openings 12 be annularly arranged on the perimeter wall, as shown in FIG. 5, equally in radial symmetry around the geometric axis 1E.

In the shown embodiments, the distribution chamber consists of eight outlet openings 12, all of which are equidistant to the perimeter wall 13 and to the inlet opening 11, thereby resulting in identical speed, pressure and density of the minced meat product flow when it reaches each of said outlet openings 12 and, after passing therethrough, producing identical minced meat product strings with an identical feeding and delivery extruding speeds.

The combined surface of all the outlet openings 12 will be equal to the surface of the inlet opening. It is proposed, for example, that each outlet opening 12 have a surface equal to or lower than 25 mm$^2$.

Each outlet opening 12 is connected through a distribution duct 40 to an extruder head 50. Said distribution ducts 40 have not been shown in the attached Figures, but their outline has been indicated by means of a phantom line in FIG. 2.

It is proposed that the distribution ducts 40 be flexible ducts. It is important that all said distribution ducts 40 be of identical length and diameter, thereby achieving that the feeding speed and the density of each minced meat product string 4 should not be altered relative to the other strings 4 that travel through the other distribution ducts.

Each distribution duct 40 communicates with one of the eight extruder heads 50, which in the present embodiment are arranged in alignment. In the embodiment shown in FIG.

2, four distribution ducts 40 are connected to four alternating extruder heads 50 from a side of the block that contains them through four elbow-shaped side openings, and the other four distribution ducts 40 are connected to the other four alternating extruder heads 50 from the other side of the block that contains them through side openings that remain hidden from the perspective represented in this FIG. 2.

Figure 3A:
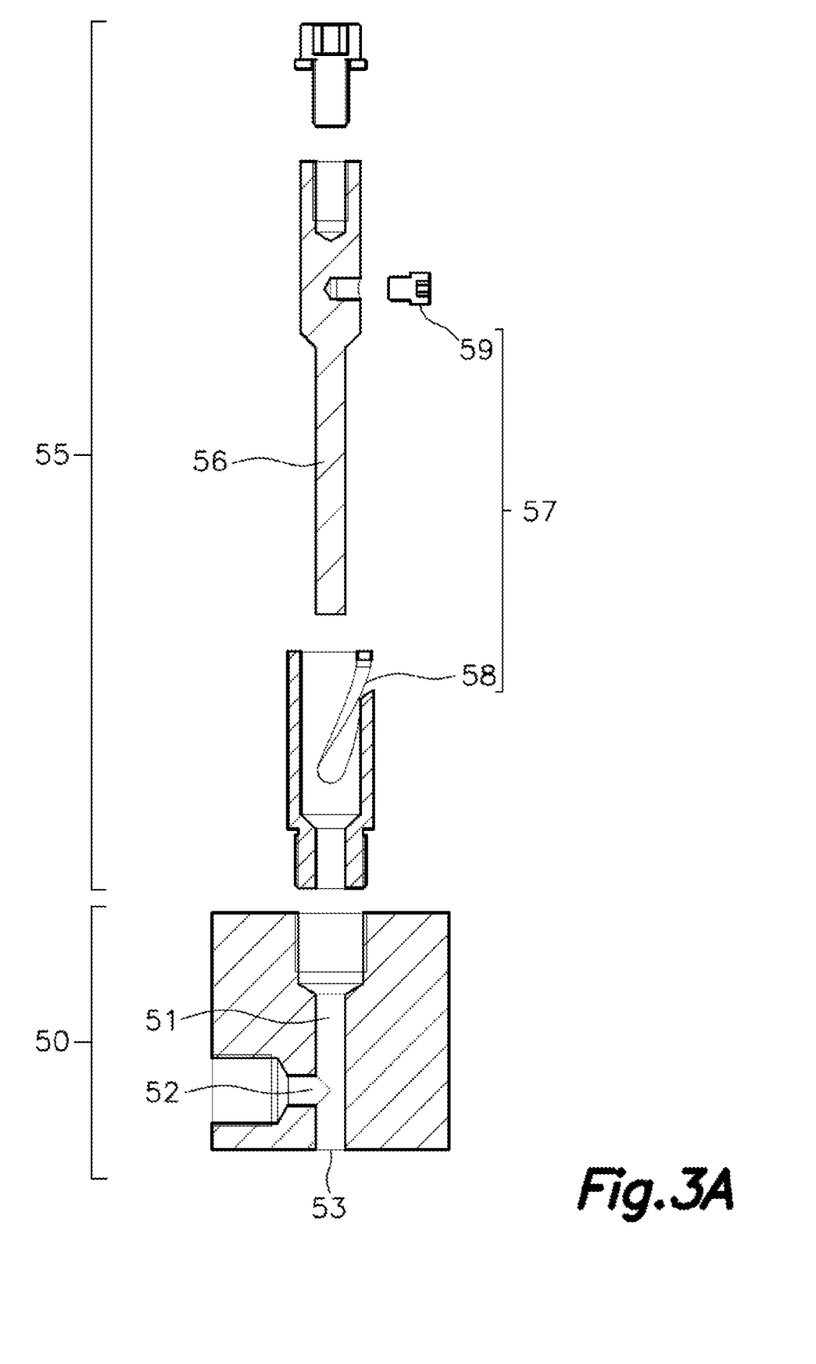
FIG. 3A depicts an exploded cross-section of an extruder head and of the associated cutting device.
Figure 3B:
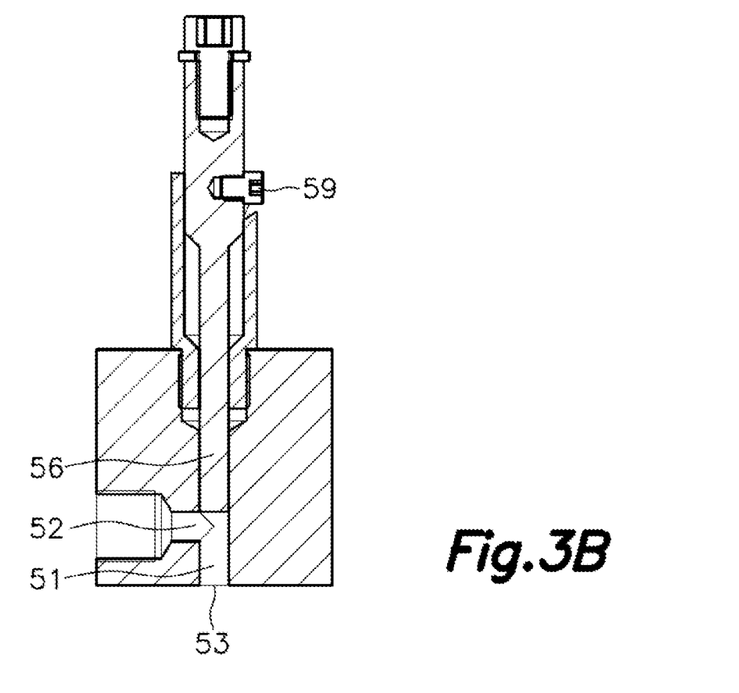
FIG. 3B depicts the same cross-section shown in FIG. 3A but assembled, the plunger being in the extruding position within the extruder head.
Figure 3C:
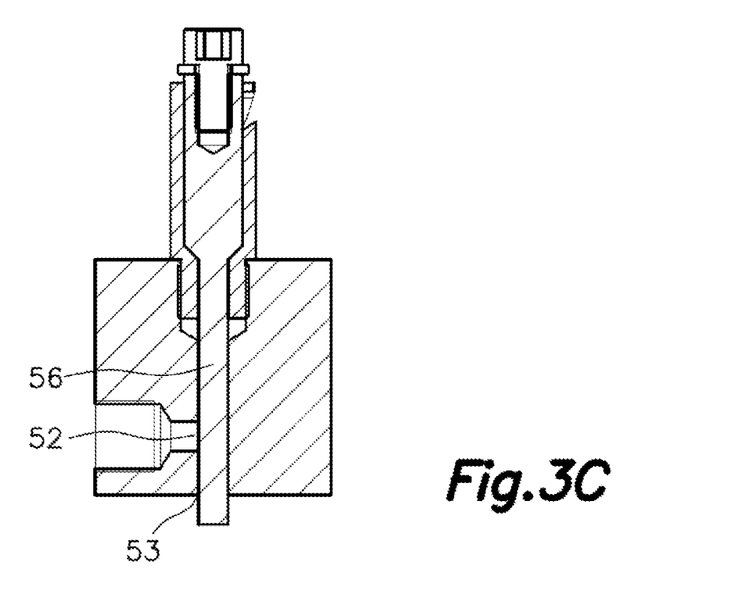
FIG. 3C depicts the same cross-section shown in FIG. 3A but assembled, the plunger being in the cutting position within the extruder head.

As shown in FIGS. 3A, 3B and 3C, each extruder head 50 consists of a hollow cylindrical duct 51 provided with a side opening 52, connected to one of the distribution ducts 40, and an extruding opening 53 facing the conveyor surface 2 for the ejection of the extruded meat product. Each extruder head 50 will also have a cutting device 55 built in.

The minced meat product flow is passed into the cylindrical duct 51 from the distribution duct 40 through the side opening and, after filling it, it is extruded from the extruder head 50 through the extruding opening 53, from which it is laid on the conveyor surface 2, which will convey it to the air treatment unit 60, where its surface will be dehydrated to generate a crust, making it manageable.

Said conveyor surface 2 moves at a speed coordinated with the delivery speed of the extruded meat product strings 4 to avoid interruptions or undue build-ups of said strings 4.

Preferably, all of the extruder heads 50 will be aligned in a transverse direction to the feeding direction of the conveyor surface 2, laying parallel strings 4 of extruded meat product.

It is also contemplated that each extruder head 50 incorporate a cutting device 55 to be able to interrupt the extruded meat product string 4 at will, abruptly generating a regular string end 4 without thinning or sharp ends that may end up becoming excessively dehydrated during the later air treatment process.

The cutting device 55 includes a plunger 56 snugly movable within the cylindrical duct 51, from an extruding position, in which the plunger does not interfere with the side opening 52, allowing for the entrance of the minced meat product, and a cutting position, in which the plunger 56 completely blocks the side opening 52, preventing the entrance of minced meat product and pushing the minced meat product contained in the cylindrical duct 51 towards the extruding opening 53. Preferably, in the cutting position, the plunger 56 reaches the extruding opening 53 completely emptying the cylindrical duct 51.

The plunger 56 is connected to a guiding device 57 that includes a cam 58 and a cam follower 59, which determines a helical movement of the plunger 56 between the extruding position and the cutting position. This rotation also prevents the adhesion of the string end 4 ejected through the extruding opening 53 to the plunger end 56 that will preferably be flat, lacking bevels.

In the present embodiment, all plungers 56 are connected to an upper plate that can move vertically driven by a driving device—for instance, a plunger or a linear motor—, causing the simultaneous lowering of each of the plungers 56 and its rotation guided by the cam; however, other embodiments are also contemplated in which each plunger 56 may be driven independently.

Additionally, in the case that the conveyor surface 2 is a series of trays, the previously mentioned cutting devices 55 will also have to be coordinated with the movement of the conveyor surface 2 to produce the cutting of the extruded meat product strings 4 coinciding with the transition between successive trays moved underneath the extruder heads 50, thereby avoiding that any strings 4 be left straddling between two successive trays.

In the present embodiment, all of the extruder heads 50 are comprised in a single block; for example, machined in the same metal block. The side openings 52 of the contiguous extruder heads have been arranged in opposite sides of the block, thereby allowing to position the extruder heads 50 closer to each other.

Each cylindrical duct 51 also includes a plunger opening in its upper end, thereby transforming the cylindrical duct 51 into a through-hole. Said plunger 56 is inserted in the cylindrical duct 51 through said plunger opening, protruding from its upper end, where a helical cam follower surrounding the protruding portion of the plunger 56 is located, which comprises one boss in the shape of a cam follower on its side that cooperates with said cam to guide the plunger 56.

The present embodiment also contemplates that the extruded meat product strings 4 laid on the conveyor surface 2, which, as is to be recalled, are lacking a wrapping film and a gelled coating, will be conveyed by said conveyor surface to the air treatment unit 60, which will apply an air current with controlled temperature, humidity and speed against the raw extruded meat product.

For example, it is proposed that the air current be applied with a temperature between 30° C. and 50° C. and with a relative humidity lower than 25%.

Figure 6:
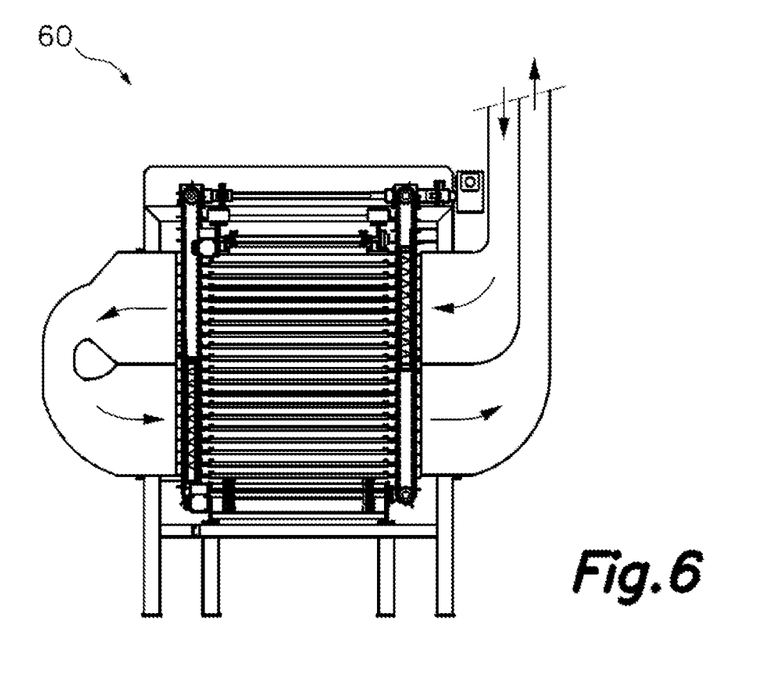
FIG. 6 depicts a cross-section of an air treatment unit embodiment, in which a plurality of trays moves in an upward direction forming a column, and where, at end of each column, a device transfers the last tray of the column to another adjacent column that moves in a downward direction.

In the embodiment shown in FIG. 6, the conveyor surface 2 consists of a plurality of trays that move adjacently underneath the extruder heads 50 at a speed coordinated with the delivery and extruding speeds, the cutting devices 55 also being coordinated with the movement of the trays to match the cut of the extruded meat product strings with the abutment between two adjacent trays. Said trays, once loaded with the extruded meat product, are passed into the air treatment unit 60 shown in FIG. 6 one by one. Said unit progressively raises each tray, overlapping them forming a column. An air duct system produces an air current that traverses the tray column removing the humidity of the extruded meat product. Upon reaching the top of the tray column, the trays may be moved to another adjacent column to start a downward movement, subject to the air flow as well.

This process will cause the superficial drying of the minced meat product string 4, making it gain cohesion, and some flexibility, while, at the same time, its plasticity and adherence are reduced. All of this makes it possible for the extruded meat product strings 4 treated in the air-drying apparatus to be handled and, therefore, removed from the conveyor surface, whether for their storage or packaging, or to receive subsequent curing treatments.

Preferably, the treatment will be continued until the humidity of the crust of the extruded meat product is equal to or lower than 15%, the inner humidity being greater; for instance, greater than 20%.

It will be understood that the different parts that constitute the invention described in an embodiment may be freely combined with the parts described in other different embodiments, even if said combination has not been explicitly described, as long as the combination is not detrimental.

The invention claimed is:

1. A meat processing unit for the production of an extruded meat product lacking a wrapping film and a gelled coating, the meat processing unit comprising:
   an extruder apparatus for a minced meat product including a distribution chamber comprising an inlet opening connected to an impeller pump for the minced meat product,
   the extruder apparatus further comprising a plurality of outlet openings, each one comprising an identical section, and disposed in communication with a corresponding one of an assembly of extruder heads, through a corresponding one of a plurality of distribution ducts for an extrusion of the minced meat product in the shape of elongated strings of the minced meat product, the elongated strings of the extruded minced meat product collectively defining the extruded meat product;

a conveyor surface facing each one of the assembly of the extruder heads and configured to receive the extruded meat product;

each one of the plurality of outlet openings disposed equidistant to the inlet opening and in a radial symmetry around a geometric axis defined by the geometric centre of the inlet opening in an annular arrangement;

the distribution chamber further comprising a bottom wall oppositely disposed to the inlet opening and centred relative to the geometric axis; the distribution chamber further comprising a perimeter wall surrounding the inlet opening and the bottom wall; the perimeter wall comprising a radial symmetry around the geometric axis that corresponds to the radial symmetry of the outlet openings; each one of the plurality of outlet openings being disposed equidistant to the perimeter wall;

each one of the plurality of distribution ducts comprising the same length between a corresponding one of the plurality of outlet openings and the corresponding one of the assembly of extruder heads; each one of the assembly of extruder heads comprising a cutting device;

the conveyor surface being structured to move through a closed enclosure of an air treatment unit where a number of blow openings direct a treated air flow against the conveyor surface that supports the extruded meat product to apply an air current comprising a controlled temperature, humidity and speed, against the extruded meat product in a raw stage, thereby producing a hardened and dehydrated outer crust that provides cohesion and allows for a handling of the extruded meat product;

each one of the assembly of extruder heads consisting of an extruder duct with a plunger opening disposed on one end thereof, and an extruding opening on an opposed end thereof; the extruding opening facing the conveyor surface for an ejection of the extruded meat product; each one of the assembly of extruder heads further comprising a side opening connected to a corresponding one of the plurality of distribution ducts, the side opening disposed between the plunger opening and the extruding opening; and the cutting device comprising a plunger inserted in the extruder duct through the plunger opening and movable within the extruder duct from an extruding position, in which the plunger does not interfere with the side opening, to a cutting position, in which the plunger completely blocks the side opening and in which the plunger reaches or goes beyond the extruding opening of the extruder duct to eject all of the extruded meat product from the interior of the extruder duct.

2. The meat processing unit according to claim 1 wherein the extruder duct comprises a cylindrical shape and the cutting device further comprises a guiding device, comprising an helical cam and a cam follower, connected to the plunger defining a helical movement of the plunger during a stroke between the extruding position and the cutting position.

3. The meat processing unit according to claim 1 wherein each one of the plurality of distribution ducts is a flexible duct.

4. The meat processing unit according to claim 1 wherein each one of the plurality of outlet openings of the extruder apparatus is disposed on the bottom wall or on the perimeter wall.

5. The meat processing unit according to claim 1 wherein the plurality of outlet openings of the distribution chamber are at least six outlet openings.

6. The meat processing unit according to claim 1 wherein the bottom wall comprises a circular shape and the perimeter wall comprises a frustoconical shape.

7. The meat processing unit according to claim 1 wherein an area of the extruding opening of each one of the assembly of extruder heads is at least 25 mm$^2$.

8. The meat processing unit according to claim 1 wherein the combined area of all of the outlet openings is equal to the area of the inlet opening of the distribution chamber.

9. The meat processing unit according to claim 1 wherein the air treatment unit applies the air current with a temperature between 30° C. and 50° C. and with a relative humidity lower than 25%.

10. The meat processing unit according to claim 1 wherein an end of the plunger in contact with the minced meat product contained in the extruder duct is a flat end perpendicular to the movement direction of the plunger.

11. A method for obtaining an extruded meat product lacking a film wrapping and a gelled coating by a meat processing unit as described in claim 1, the method comprising the following steps:

a) forcing the minced meat product through the extruder apparatus by the impeller pump, producing:
   a complete filling of the distribution chamber;
   an even distribution of the minced meat product through each one of the plurality of outlet openings of the distribution chamber, producing multiple homogeneous flows of the minced meat product each one flowing through a one of the plurality distribution ducts to the corresponding one of the assembly of extruder heads; and
   an extrusion of the minced meat product through each one of the extruder heads, producing multiple elongated strings of the extruded meat product, each one comprising an even extrusion flow;

b) laying the elongated strings of the extruded meat product on the conveyor surface that moves at a speed coordinated with a delivery speed of the extruded meat product; selectively interrupting the extruded meat product elongated string by the cutting device disposed on each extruder head;

c) conveying, by the conveyor surface, the extruded meat product through the air treatment unit that applies the air current with a controlled temperature, humidity and speed, against the extruded meat product in a raw stage, until obtaining an extruded meat product comprising a hardened and dehydrated outer crust to produce cohesion and allow for the handling of the extruded meat product;

the cutting device of each extruder head is moved within the extruder duct from an extruding position, in which the plunger does not interfere with a side opening, to a cutting position, in which the plunger completely blocks the side opening and in which the plunger reaches or goes beyond the extruding opening of the extruder duct ejecting all of the extruded meat product from the interior of the extruder duct.

12. The method according to claim 11 wherein the air treatment unit applies the air current with a temperature between 30° C. and 50° C. and with a relative humidity lower than 25%.

13. The method according to claim 12 wherein the extruded meat product is treated by the air treatment unit until the dehydrated outer crust is produced comprising a relative humidity lower than 15% and a core with a relative humidity greater than 20%.

14. The method according to claim 11 wherein the extruder duct is a cylindrical duct and wherein the cutting device of each extruder head is driven at preset intervals moving from the extruding position to the cutting position while moving the plunger following the helical movement defined by the helical cam of the guiding device.

15. The method according to claim 14 wherein the cutting device is immediately returned to the extruding position after reaching the cutting position, resulting in the cut of the elongated string of the extruded meat product laid on the conveyor surface.

* * * * *